US010865849B2

(12) United States Patent
Cultraro (10) Patent No.: US 10,865,849 B2
(45) Date of Patent: Dec. 15, 2020

(54) LINEAR SHOCK ABSORBER WITH IMPROVED OBSTRUCTING MEMBER (71) Applicant: Cultraro Automazione Engineering S.r.l., Rivoli (IT)

(72) Inventor: Paolo Cultraro, Rivoli (IT)

(73) Assignee: Cultraro Automazione Engineering S.r.l., Rivoli (IT)

(*) Notice: Subject to any disclaimer, the term of this patent is extended or adjusted under 35 U.S.C. 154(b) by 100 days.

(21) Appl. No.: 15/968,068

(22) Filed: May 1, 2018

(65) Prior Publication Data
US 2018/0335103 A1 Nov. 22, 2018

(30) Foreign Application Priority Data

May 17, 2017 (IT) .......................... 102017000053353

(51) Int. Cl.
*F16F 7/09* (2006.01)
*F16F 9/48* (2006.01)
(Continued)

(52) U.S. Cl.
CPC ............... *F16F 9/48* (2013.01); *F16F 9/061* (2013.01); *F16F 9/19* (2013.01); *F16F 9/3214* (2013.01);
(Continued)

(58) Field of Classification Search
CPC .. F16F 7/09; F16F 9/061; F16F 9/0227; F16F 9/3214; F16F 9/3228; F16F 9/3405;
(Continued)

(56) References Cited

U.S. PATENT DOCUMENTS

| 2006/0151271 A1* | 7/2006 | Rova ..................... F16F 9/3405 188/322.15 |
| 2011/0233015 A1* | 9/2011 | Rioja Calvo ......... F16F 9/3415 188/316 |
| 2013/0206522 A1* | 8/2013 | Cultraro ................. F16F 9/064 188/269 |

FOREIGN PATENT DOCUMENTS

| DE | 10153152 A1 * | 5/2003 | ............... F16F 7/09 |
| DE | 202014004809 U1 | 9/2014 | |

(Continued)

OTHER PUBLICATIONS

Search Report and Written Opinion from the Italian Patent Office dated Jan. 22, 2018 for corresponding IT Application No. 201700053353.

*Primary Examiner* — Bradley T King
*Assistant Examiner* — Stephen M Bowes
(74) *Attorney, Agent, or Firm* — Walter | Haverfield LLP; D. Peter Hochberg; Sean F. Mellino (57) ABSTRACT

Shock absorber comprising a tubular base, a piston, a stem connected to the piston, and a plurality of fluid paths for connecting a working chamber and an accumulation chamber on opposite sides of the piston, one of which provides for a ring-shaped obstructing member arranged about the piston and able to slide along an axial length of the piston. The obstructing member comprises a bush of plastic material, which has a flexible lip portion extending from a rear end of the bush and having a radially outer surface tapered towards the rear end of the bush, the lip portion being adapted to seal against a radially inner surface of the base when the obstructing member is in a closed configuration. A support ring member is adapted to radially engage the lip portion of the bush from within, and to push it against the radially inner surface of the base.

4 Claims, 8 Drawing Sheets (51) Int. Cl.
  *F16F 9/36*  (2006.01)
  *F16F 9/32*  (2006.01)
  *F16F 9/19*  (2006.01)
  *F16F 9/34*  (2006.01)
  *F16F 9/06*  (2006.01)
  *F16F 9/516* (2006.01)
  *F16F 13/00* (2006.01)

(52) U.S. Cl.
  CPC .......... *F16F 9/3405* (2013.01); *F16F 9/3415* (2013.01); *F16F 9/368* (2013.01); *F16F 9/516* (2013.01); *F16F 9/3271* (2013.01); *F16F 13/007* (2013.01); *F16F 2224/0208* (2013.01); *F16F 2228/066* (2013.01); *F16F 2230/0005* (2013.01); *F16F 2230/30* (2013.01)

(58) Field of Classification Search
  CPC .......... F16F 9/3415; F16F 9/368; F16F 9/512; F16F 9/516; F16F 9/34; F16F 9/36
  See application file for complete search history.

(56) References Cited

FOREIGN PATENT DOCUMENTS

| | | | | |
|---|---|---|---|---|
| EP | 2630388 B1 | * | 1/2015 | ............... F16F 9/064 |
| FR | 1122015 A | * | 8/1956 | ................ F16F 7/09 |
| GB | 1411611 A | * | 10/1975 | ................ F16F 7/09 |

\* cited by examiner

LINEAR SHOCK ABSORBER WITH IMPROVED OBSTRUCTING MEMBER

CROSS-REFERENCE TO RELATED APPLICATION

This application claims foreign priority to Italian Serial No. 102017000053353 filed on May 17, 2017, the content of which is incorporated herein by reference in its entirety.

BACKGROUND OF THE INVENTION

Field of the Invention

The present invention relates to a shock absorber, comprising: a tubular base;

a piston assembly comprising a piston mounted within the tubular base with an alternate sliding motion, said piston defining within the tubular base a working chamber and an accumulation chamber arranged on the rear side and on the front side of the piston respectively, and a stem connected to the piston;

a plurality of fluid paths for connecting the working chamber with the accumulation chamber, at least one of which establishes a permanent fluid communication between the working chamber and the accumulation chamber; and valve means arranged on one of the fluid paths, or valved fluid path, which comprise a ring-shaped obstructing member arranged around the piston and capable of sliding along an axial length of the piston, wherein said valved fluid path comprises a path portion formed between the piston and the obstructing member, whereby said valved fluid path is capable of selectively assuming an open configuration, wherein said valved fluid path establishes a fluid communication between the working chamber and the accumulation chamber, and a closed configuration, wherein said valved fluid path is blocked;

wherein said obstructing member comprises a bush of plastic material, which has a flexible lip portion extending from a rear end of the bush and having a radially outer surface tapered towards said rear end of the bush.

The lip portion is adapted to exert a sealing contact against said radially inner surface of the base when said valved fluid path is in a closed configuration and a fluid pressure in the working chamber is greater than a fluid pressure in the accumulation chamber.

Description of the Prior Art

A shock absorber of this type is known from the Italian utility model no. 280664 of the same Applicant.

It has been noted that wear on the device can lead to permanent deformation of the lip portion, which curves inwardly. Such condition is obviously not acceptable because, due to the reduced sealing capacity of the lip portion, the overall performance of the shock absorber is impaired.

BRIEF SUMMARY OF THE INVENTION

The object of the present invention is to provide a shock absorber of the type defined above, which allows the aforementioned drawback to be overcome.

Such object is achieved according to the invention by a shock absorber of the type defined initially, wherein the shock absorber further comprises a ring-shaped support member arranged coaxially with the bush and movable with respect thereto, said support ring member comprising a radially outer surface tapered towards the rear end of the bush and adapted to engage radially the lip portion of the bush from the inside of the lip portion and push it against a radially inner surface of said base, in such a way that said lip portion is adapted to exert a sealing contact against said radially inner surface of the base when said valved fluid path is in a closed configuration and a fluid pressure in the working chamber is greater than a fluid pressure in the accumulation chamber.

Preferred embodiments of the invention are defined in the dependent claims, which are intended as an integral part of the present description.

BRIEF DESCRIPTION OF THE DRAWINGS

Further features and advantages of the device according to the invention will become more apparent in the following detailed description of an embodiment of the invention, made with reference to the accompanying drawings, provided purely to be illustrative and non-limiting, wherein.

DETAILED DESCRIPTION OF THE PREFERRED EMBODIMENTS

With reference to FIGS. 1 to 4, a shock absorber according to the invention comprises a tubular base 10, a piston assembly 12, and other components conventional per se, such as a bearing/plug 14 to support the piston assembly and a return spring 16.

The tubular base 10 comprises a main tubular base portion 10a and a rear end wall portion 10b at the rear end of the base. In the present description, the terms "front" and "rear" are intended in the longitudinal direction of the shock absorber and are used with reference to the end of the shock absorber where the piston stem is inserted. The main tubular base portion 10a has therein a cavity delimited radially by a radially inner surface 10d of the base.

Figure 1:
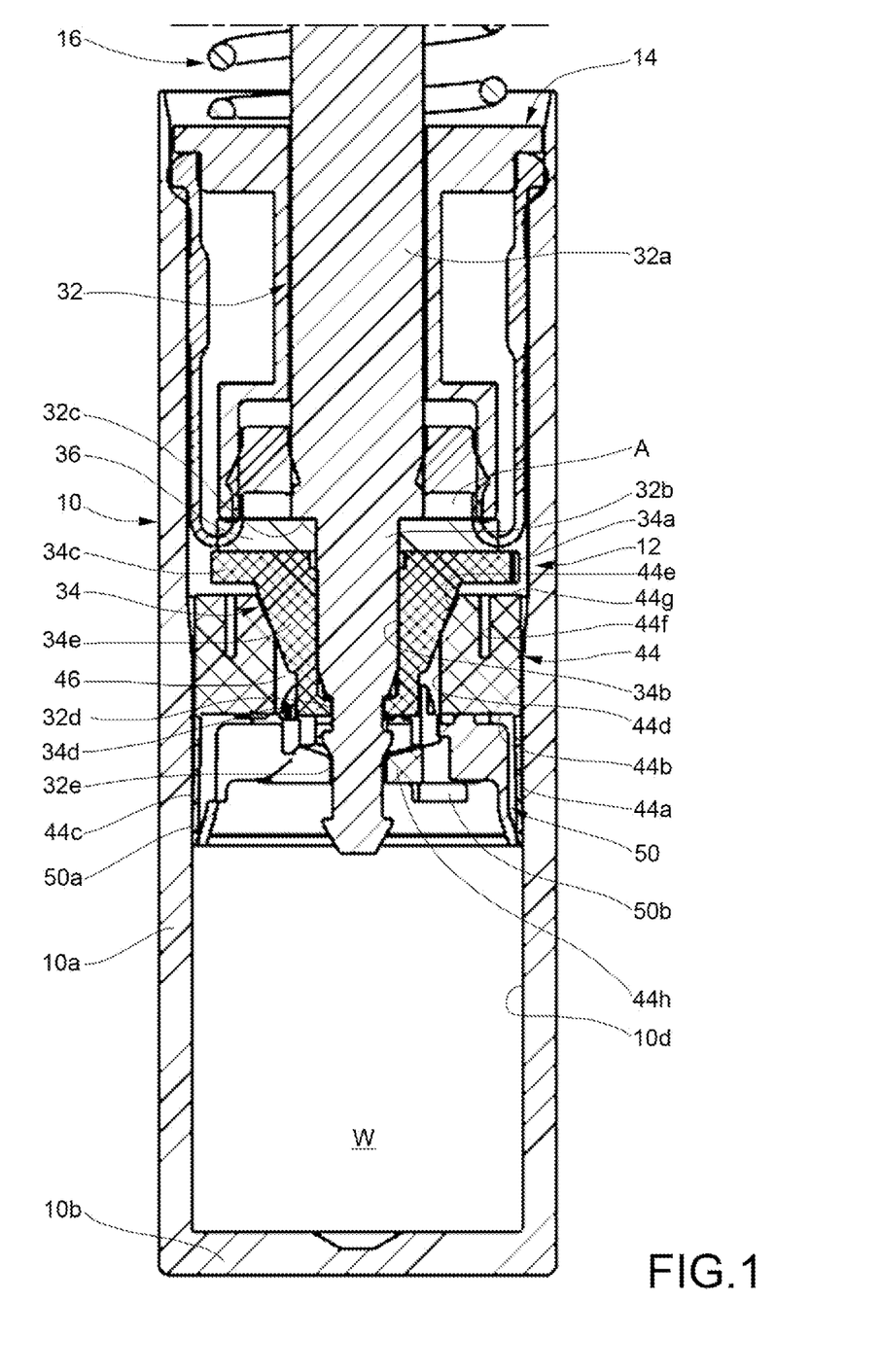
FIG. 1 is a partial and longitudinal sectional view of a linear shock absorber according to the invention, with the valve open.
Figure 2:
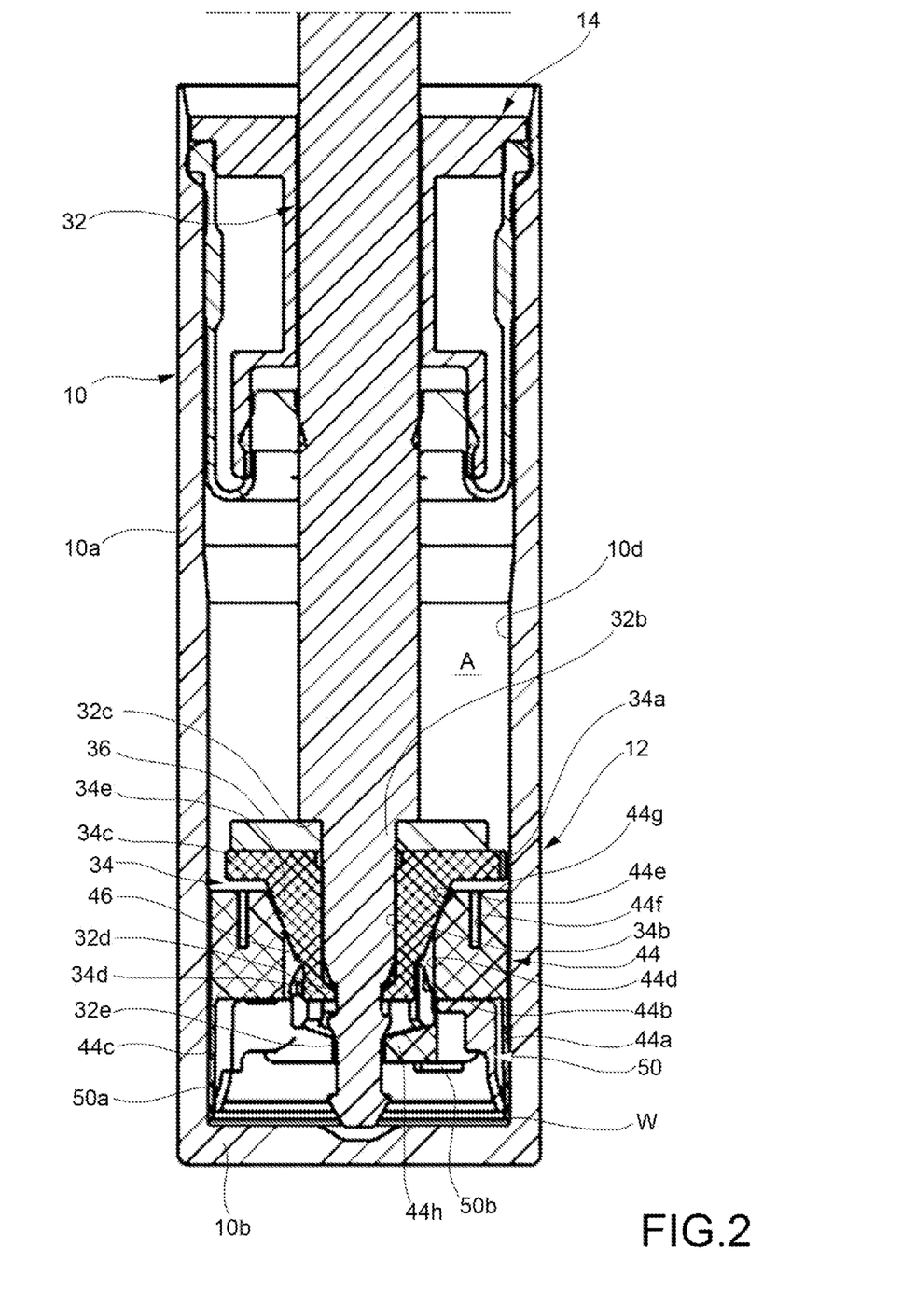
FIG. 2 is a partial and longitudinal sectional view of the linear shock absorber of FIG. 1, with the valve closed.

A bearing/plug 14 is sealed or integrally formed on a front end of the tubular base 10, to support the piston stem and allow a front end thereof to emerge outward.

The piston assembly 12 comprises a stem 32, a piston 34, and a reinforcing member 36.

The stem 32 comprises a main body portion 32a, a piston bearing portion 32b with reduced diameter near the rear end of the stem and connected to the main body portion 32a via a ring-shaped shoulder portion 32c, and a piston mounting groove 32d and a valve mounting groove 32e, both formed on the piston bearing portion 32b.

The piston 34 has a substantially bush-like shape and has a maximum outer diameter 34a sized to slide smoothly into the cavity 10d of the tubular base 10 and an inner cavity 34b arranged around the piston support portion 32b of the stem 32; between the inner cavity 34b of the piston and the piston bearing portion 32b, a passage is defined.

The piston 34 comprises a flanged end portion 34c at its front end, a retaining end portion 34d at its rear end, and a frustoconical intermediate portion 34e which connects the end portions 34c and 34d to each other. The flanged end portion 34c defines the outer diameter 34a of the piston 34, and on its front side has a plurality of grooves arranged in a radial pattern. Through-holes communicating with such grooves are made through the flanged portion 34c of the piston 34. The retaining end portion 34d is formed by a plurality of retaining projections extending radially inwardly, which engage the piston retaining groove 32d formed on the radially outer surface of the piston bearing portion 32b of the stem 32. In this way, the piston 34 is anchored axially to the piston bearing portion 32b, with a certain play defined by the width of the groove 32d. The frustoconical intermediate portion 34e is arranged so as to taper from the flanged end portion 34c towards the retaining end portion 34d.

The piston 34 is a member made of a single piece of plastic material; to avoid deformations during use of its flanged portion 34c, between such flanged portion 34c and the ring-shaped shoulder portion 32c of the stem a ring-shaped reinforcing member 36, preferably made of metallic material, is interposed.

About the piston 34, at the frustoconical intermediate portion 34e, a valve obstructing member is arranged, formed by a bush 44 made of plastic material. Such bush 44 has a flexible lip portion 44a extending from a rear end 44b of the bush 44 and has a radially outer surface 44c tapered towards the rear end 44b of the bush 44; the lip portion 44a is adapted to seal against the radially inner surface 10d of the base 10 in the manner described hereinafter.

In the bush 44, a cavity furthermore is formed, delimited by a radially inner surface 44d of the bush; such radially inner surface 44d has a conical portion 44e. Between the radially inner surface 44d of the bush 44 and the radially outer surface of the frustoconical intermediate portion 34e of the piston 34, a ring-shaped passage 46 is defined.

A circumferential groove 44f is formed on a front end face 44g of the bush 44. The bush 44d moreover has a plurality of retaining projections 44h extending radially inwardly, which engage the piston retaining groove 32d formed on the radially outer surface of the piston bearing portion 32b of the stem 32. In this way, the bush 44 is anchored axially to the piston bearing portion 32b, with a certain travel defined by the width of the groove 32e. The bush 44 is therefore free to move, with respect to the stem 32 and the piston 34, along a longitudinal length defined by the width of the groove 32e.

The piston 34 axially divides the inner cavity of the tubular base 10 into a working chamber W, arranged between the piston 34 and the end wall 10b of the tubular base 10, and into an accumulation chamber A, arranged between the piston 34 and the bearing/plug 14. Such chambers are filled with a viscous fluid, for example silicone oil, which passes from one chamber to another during the operation of the shock absorber in the manner described hereinafter. Between the bush 44 and the flanged portion 34c of the piston, a variable volume transition chamber is defined, which on one side is connected to the accumulation chamber A through the through-holes and the grooves of the flanged portion of the piston (and possibly, also through the gap between the flanged portion 34c of the piston and the radially inner surface 10d of the base), and on the other side connected to the working chamber W through the ring-shaped passage 46, with a variable cross-section, between the radially inner surface 44d, 44e of the bush 44 and the radially outer surface of the frustoconical intermediate portion 34e of the piston 34.

The bush 44 interacts with the radially outer surface of the frustoconical portion 34e of the piston forming a valve, the obstructing member of which is composed of the bush 44 and the seat of which is composed of the radially outer surface of the frustoconical portion 34e. By virtue of such valve configuration, the fluid path (hereinafter, the valved fluid path), comprising the ring-shaped passage 46, is able to selectively assume an open configuration, wherein such fluid path establishes a fluid communication between the working chamber W and the accumulation chamber A, and a closed configuration, wherein this fluid path is blocked.

The shock absorber further comprises a support ring member 50 made of plastic material, arranged coaxially with the bush 44. In particular, the support ring member 50 is inserted within a region surrounded by the lip portion 44a of the bush 44 and comprises a radially outer surface 50a at least partially tapered towards the rear end 44b of the bush 44. The radially outer surface 50a of the support ring member 50 is adapted to radially engage the lip portion 44a of the bush 44 from within, and to push it against the radially inner surface 10d of the base 10.

Figure 3:
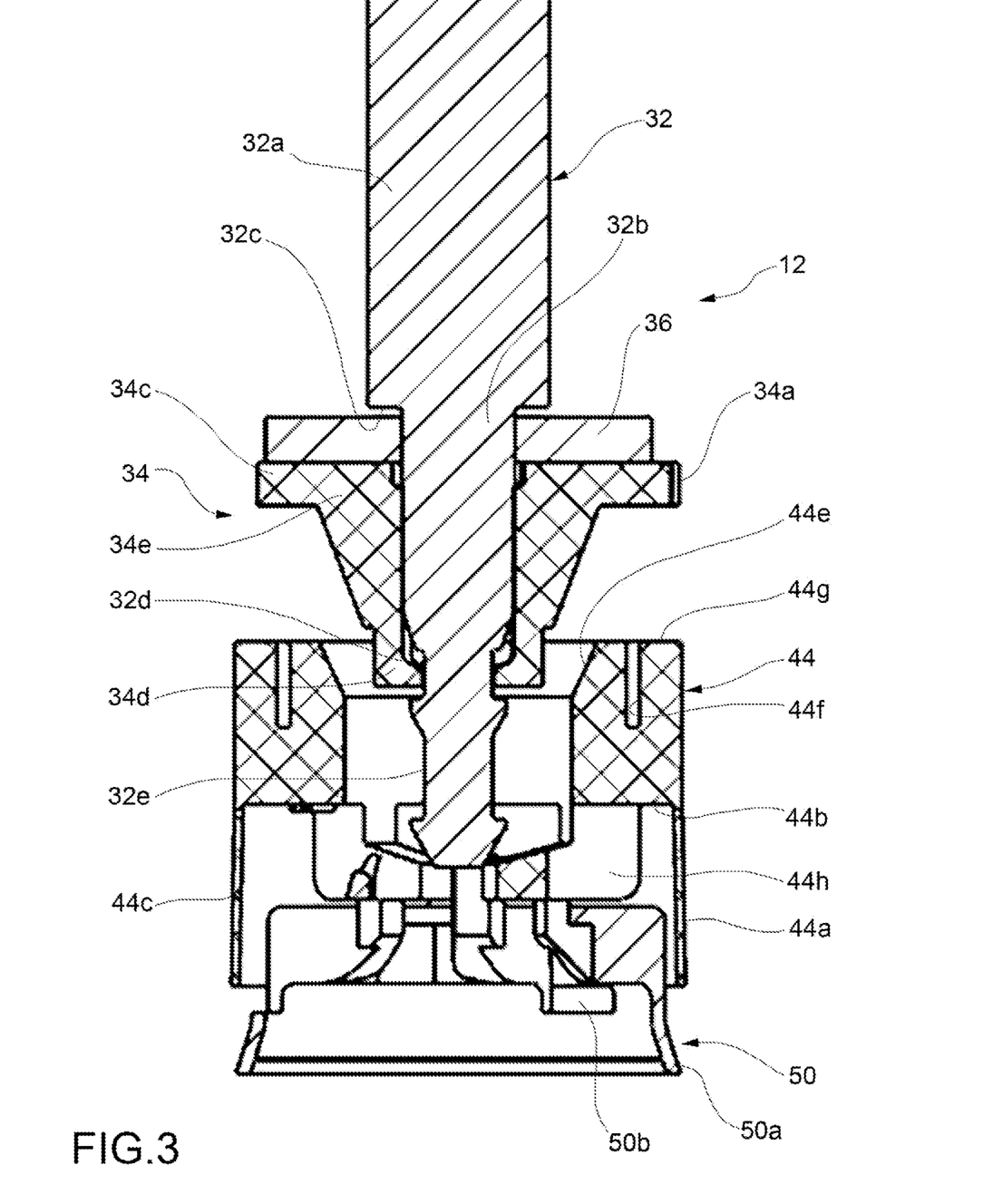
FIG. 3 is an exploded sectional view of some components of the shock absorber of FIGS. 1 and 2.
Figure 4:
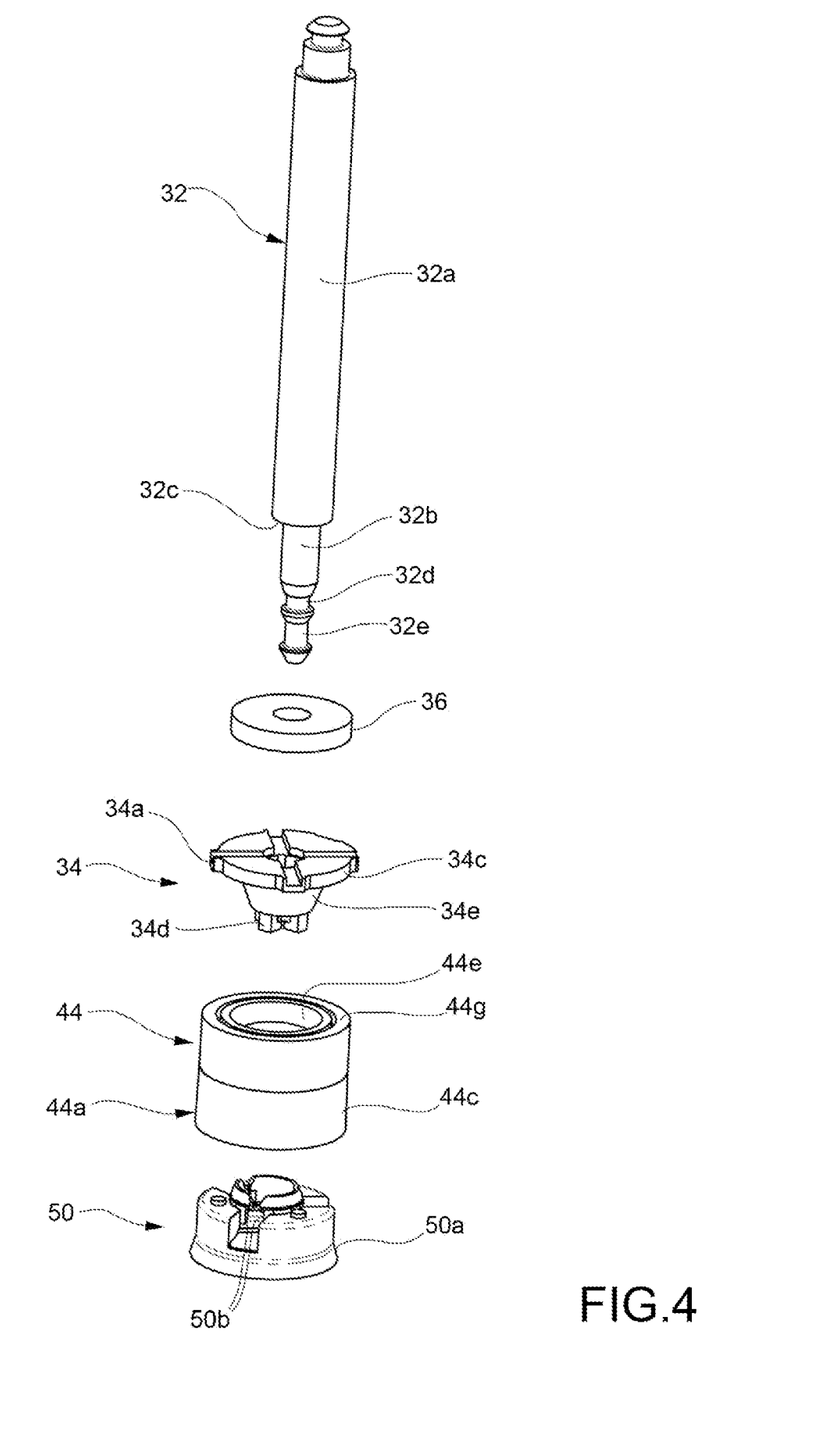
FIG. 4 is an exploded perspective view of the components of FIG. 3.

The support ring member 50 comprises a plurality of pairs of fastening tongues 50b extending radially inwardly. Each pair of tongues 50b is snap-fitted to a respective retaining projection 44h of the bush 44. In this way, the support ring member 50 is anchored to the bush 44; the coupling between the tongues 50b and the retaining projections 44h is, however, sized in such a way as to permit a certain travel in the axial direction of the support ring member 50 with respect to the bush 44.

FIG. 1 shows the shock absorber according to the invention when the aforesaid valve is in the open position; such position of the valve is reached with the movement of the piston 34, which moves from the position of maximum retraction (near the end wall 10b of the shock absorber) to the position of maximum distension. During such movement, by means of the play on the stem 32, the bush 44 moves away from the frustoconical portion 34e until it reaches a certain distance determined by the width of the bush mounting groove 32e (such separation is not shown in FIG. 1). For its part, the lip portion 44a of the bush 44 flexes to a limited extent inwardly, allowing a certain passage of fluid along the radially outer surface of the bush 44. This is allowed by the fact that the support ring member 50 moves away from the end surface 44b of the bush, until reaching a certain distance determined by the play between the snap-fastening tongues 50b of the ring-shaped member 50 and the retaining projections 44h of the bush 44, and therefore the radially outer surface 50a does not push the lip portion 44a of the bush 44 outwards.

The working chamber is therefore in fluid communication with the accumulation chamber A through several paths. A first path is formed by the passage defined between the radially inner surface 34b of the piston and the radially outer surface of the bearing portion 32b of the shaft 32, and by the grooves radially arranged on the front side of the flanged end portion 34c of the piston. A second path is formed by the ring-shaped passage between the radially inner surface 44d, 44$e$ of the bush 44 and the radially outer surface of the frustoconical intermediate portion 34$e$ of the piston 34, the transition chamber, the through-holes in the flanged portion of the piston and the grooves. radially arranged on the front side of the flanged end portion 34$c$ of the piston (and possibly also by the gap between the flanged portion 34$c$ of the piston and the radially inner surface 10$d$ of the base). A third path comprises the passage defined between the radially outer surface of the bush 44 and the radially inner surface 10$d$ of the base 10.

By virtue of the arrangement described above, during the distension movement of the piston 34, the braking force exerted by the viscous fluid is practically irrelevant, and therefore the piston 34 may move freely.

FIG. 2 shows the shock absorber according to the invention when the valve mentioned above is in the closed position; such position of the valve is reached with the movement of the piston 34 which moves from the position of maximum distension to the position of maximum retraction (near the end wall 10$b$ of the shock absorber). During such movement, due to the pressure in the working chamber W, the bush 44 approaches the frustoconical portion 34$e$ until the conical portion 44$e$ of the radially inner surface 44$d$ of the bush engages with the radially outer surface of the frustoconical portion 34$e$ of the piston 34. The circumferential groove 44$f$ formed on the front face of the bush 44 allows a certain degree of deformation of the latter, improving the seal. For its part, the support ring member 50 is wedged inside the lip portion 44$a$ of the bush 44, and therefore the lip portion 44$a$ is pushed by the tapered outer surface 50$a$ of the support ring member 50 against the radially inner surface 10$d$ of the base 10, forming a sealed engagement.

The working chamber is therefore in fluidic communication with the accumulation chamber A only through the first path, formed by the passage defined between the radially inner surface 34$b$ of the piston and the radially outer surface of the bearing portion 32$b$ of the shaft 32, and from the grooves radially arranged on the front side of the flanged end portion 34$c$ of the piston. The second and third fluid paths are, on the other hand, closed respectively by the conical portion 44$e$ of the radially inner surface 44$d$ of the bush 44, which engages the radially outer surface of the frustoconical portion 34$e$ of the piston 34, and the lip portion 44$a$ of the bush 44, which engages the radially inner surface 10$d$ of the base 10.

By virtue of the arrangement described above, during the retraction movement of the piston 34, the braking force exerted by the viscous fluid is significantly greater than that exerted during the distension movement, and therefore the piston 34 is braked. The braking action is then calibrated as a function of the sizing of the section of the first fluid path, and in particular of the passage formed between the bearing portion 32$b$ of the shaft 32 and the radially inner surface 34$b$ of the piston.

Advantageously, if the radially inner surface 10$d$ of the base 10 has at least one conical length tapering towards the end wall 10$b$ (as clearly visible in FIGS. 1 and 2), it is possible to attribute a characteristic of progressivity to the braking action of the fluid: in the front part of the base 10, wherein the inner cavity has a larger diameter, the lip portion 44$a$ of the bush 44 engages the radially outer surface 10$d$ of the base 10 with less force; therefore, in the front part there is less of a braking action than that which occurs near the rear end wall 10$b$. Overall, the braking action increases progressively as the piston 34 advances.

The arrangement of the fluid paths between the working chamber and the accumulation chamber is not essential for the purposes of the invention, provided that such paths comprise a passage between the radially outer surface of the bush and the radially inner surface of the base.

In this regard, FIGS. 5-8 show a second embodiment of a shock absorber according to the invention. The same reference numbers have been assigned to members corresponding to those of the preceding embodiment. For simplicity, the tubular base of the shock absorber is not shown.

A stem 32 comprises therein a main body portion 32$a$, a piston bearing portion 32$b$ with reduced diameter near the rear end of the stem and connected to the main body portion 32$a$ via a ring-shaped shoulder portion 32$c$.

A piston 34 is coaxially mounted, for example, snap-mounted, onto the piston bearing portion 32$b$. The piston 34 has the form of a push rod and has a maximum outer diameter 34$a$, sized to insert slidingly into the cavity of the tubular base, and a duct 34$b'$ formed within the piston 34. On the surface of the duct 34$b'$ are arranged one or more longitudinal grooves 34$b''$ formed between the radially inner surface of the piston 34 and the piston bearing portion 32$b$ of the stem 32.

The piston 34 comprises a flanged end portion 34$c'$ at its front end, a stem end portion 34$d'$ at its rear end, and a valve bearing intermediate portion 34$e'$ which connects the end portions 34$c$ and 34$d$ to each other. On the stem end portion 34$d'$, two retaining flanges 34$d''$ and 34$d'''$ are made in consecutive axial positions. The flanged end portion 34$c'$ defines the outer diameter 34$a$ of the piston 34 and on the front side thereof has a plurality of grooves arranged in a radial pattern. Through-holes communicating with such grooves are obtained through the flanged portion 34$c'$ of the piston 34. The piston 34 is a member made of a single piece of plastic material; to avoid deformations of its flanged portion 34$c'$ during use, between such flanged portion 34$c'$ and the ring-shaped shoulder portion 32$c$ of the stem, a reinforcing ring member 36, preferably made of metallic material, is interposed.

About the piston 34, at the valve bearing portion 34$e'$, a valve obstructing member is arranged, formed by a bush 44 made of plastic material. Such bush 44 has a flexible lip portion 44$a$ extending from a rear end 44$b$ of the bush 44 and having a radially outer surface 44$c$ tapered towards the rear end 44$b$ of the bush 44; the lip portion 44$a$ is adapted to seal against the radially inner surface of the base.

In the bush 44 a cavity moreover is formed delimited by a radially inner surface 44$d$ of the bush. The minimum diameter of such radially inner surface 44$d$ is substantially equal to the outer diameter of the valve bearing portion 34$e'$ of the piston.

The bush 44$d$ also has a plurality of retaining projections 44$h$ extending radially inwardly, which engage a length of the stem portion 34$d'$ of the piston 34 comprised between the valve bearing portion 34$e'$ and the retaining flange 34$d''$. In this way, the bush 44 is axially anchored to the stem portion 34$d'$ of the piston, with a certain travel defined by the width of the length between the valve bearing portion 34$e'$ and the retaining flange 34$d''$. The bush 44 is therefore free to move, with respect to the stem 32 and the piston 34, along a longitudinal length defined by the width of the length between the valve bearing portion 34$e'$ and the retaining flange 34$d''$.

Figure 5:
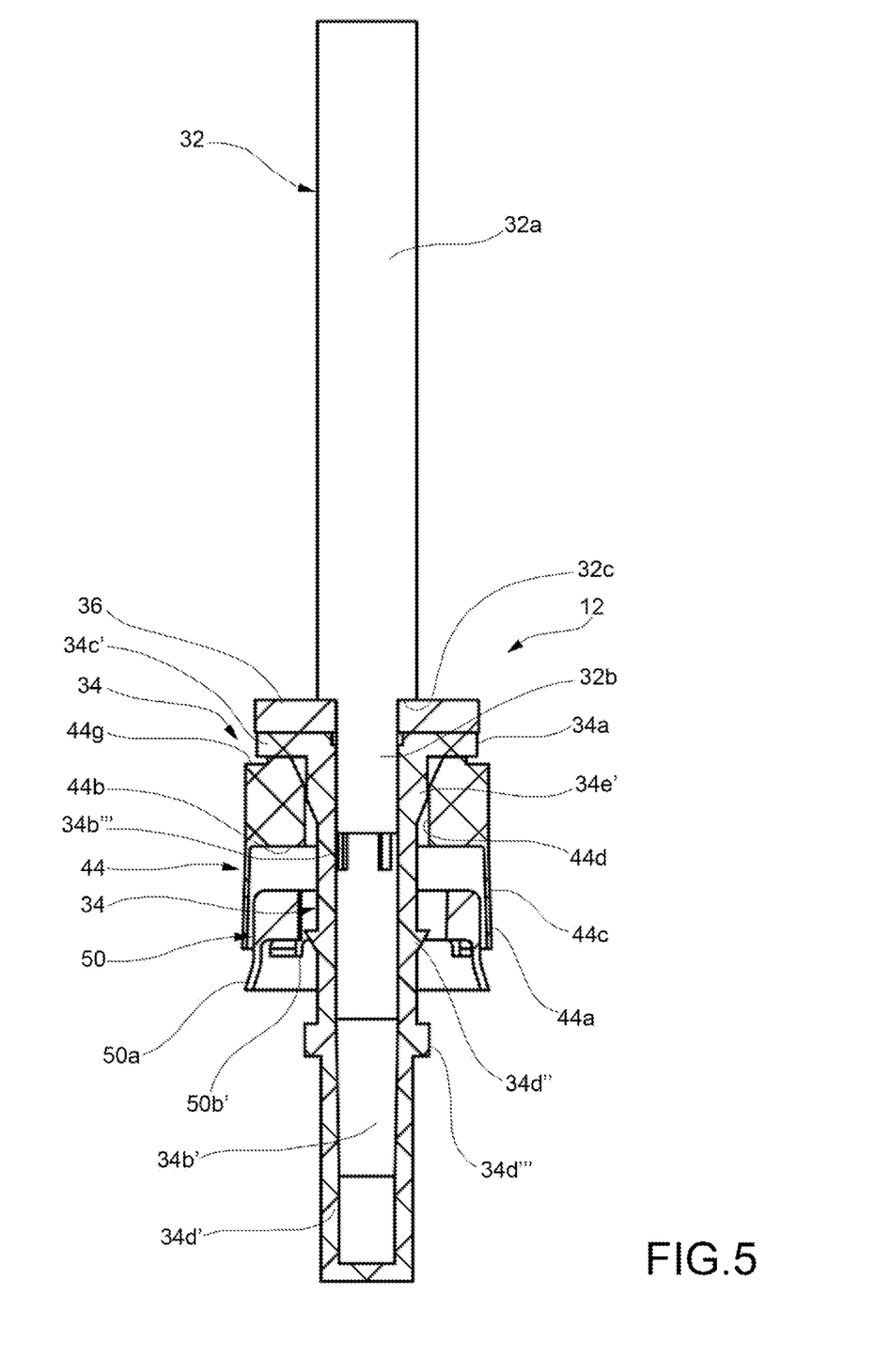
FIG. 5 is a partial and longitudinal sectional view of a second embodiment of a linear shock absorber according to the invention, with the valve open.
Figure 6:
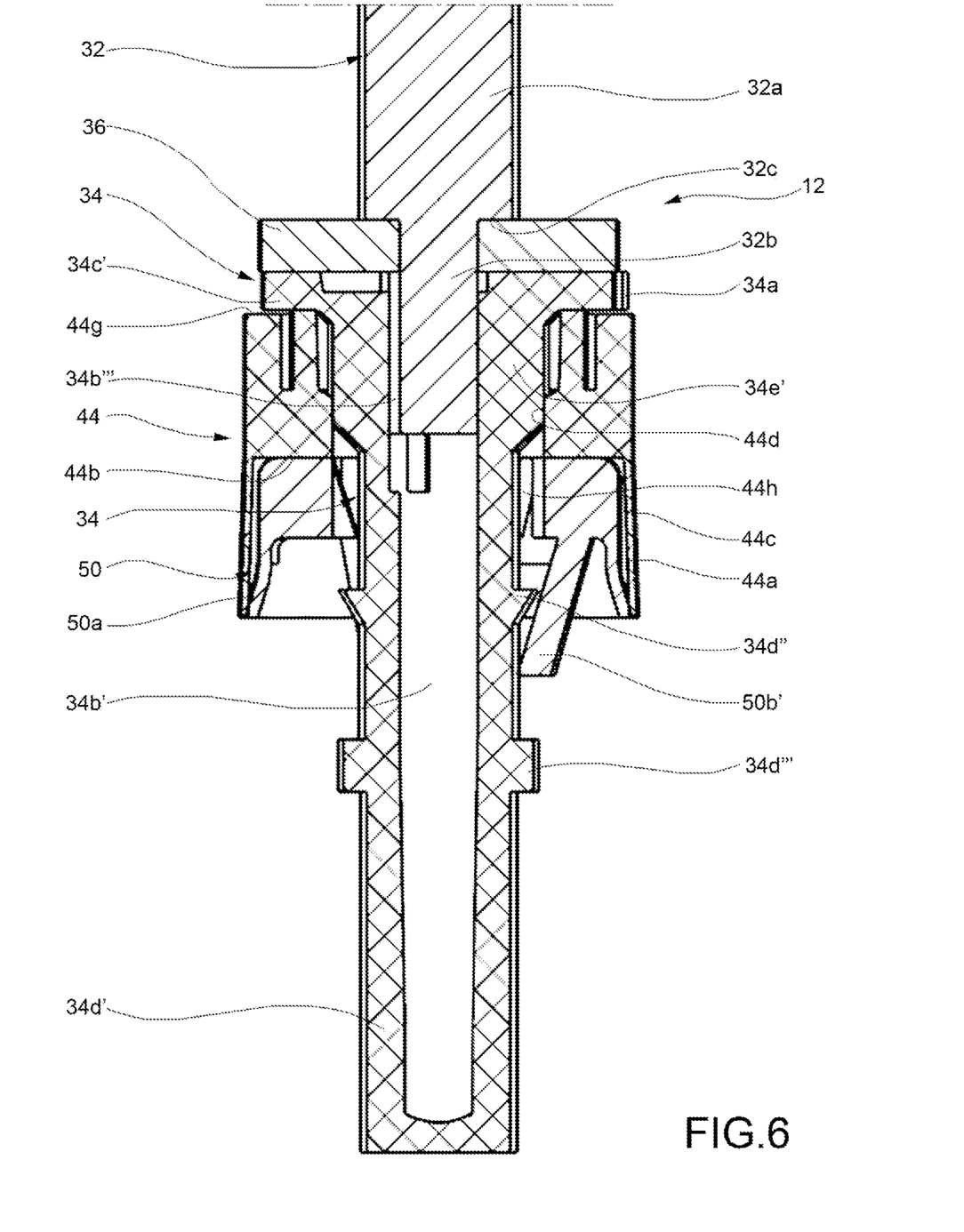
FIG. 6 is a partial and longitudinal sectional view of the linear shock absorber of FIG. 5, with the valve closed.
Figure 7:
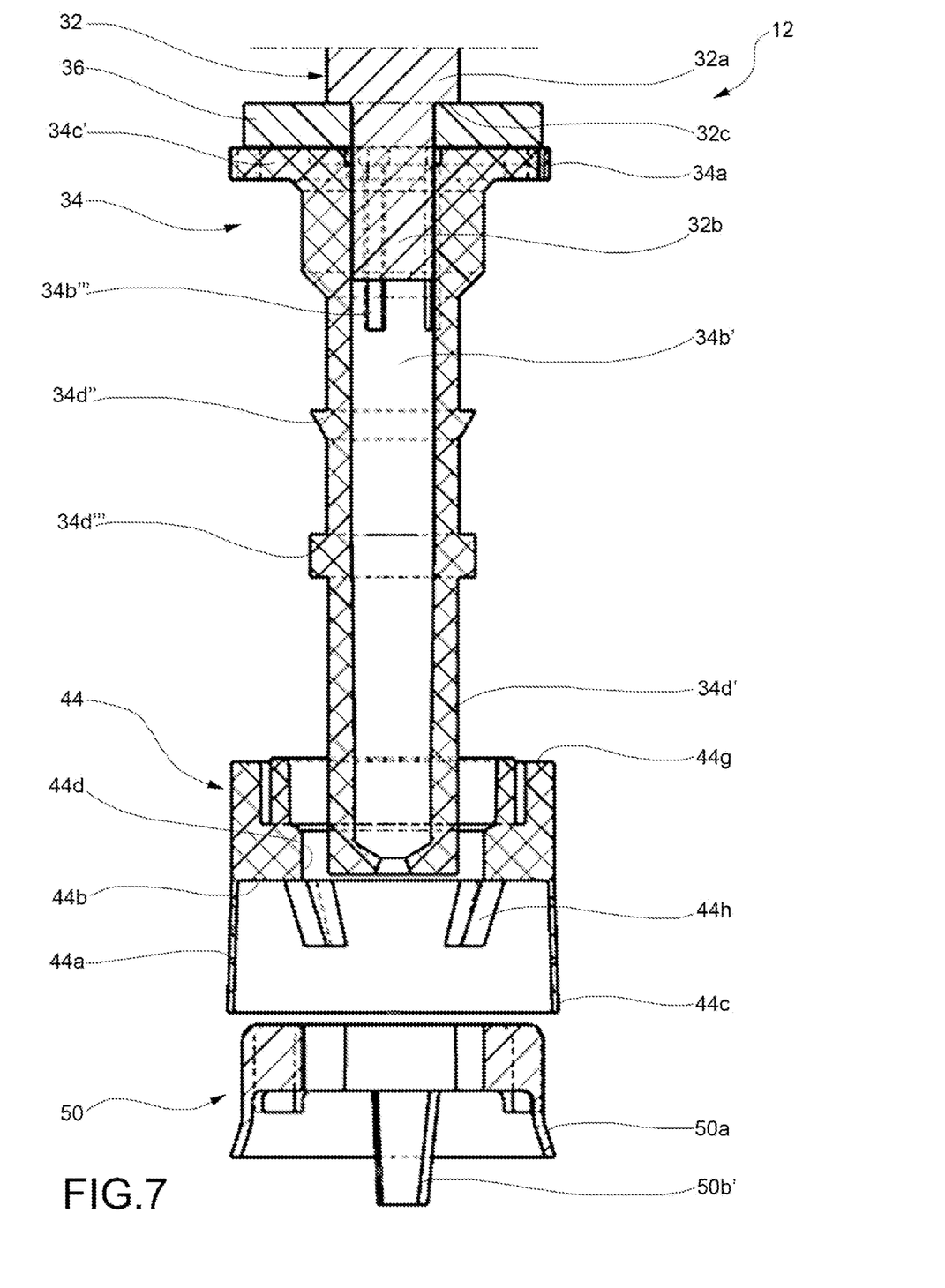
FIG. 7 is an exploded sectional view of some components of the shock absorber of FIGS. 5 and 6.
Figure 8:
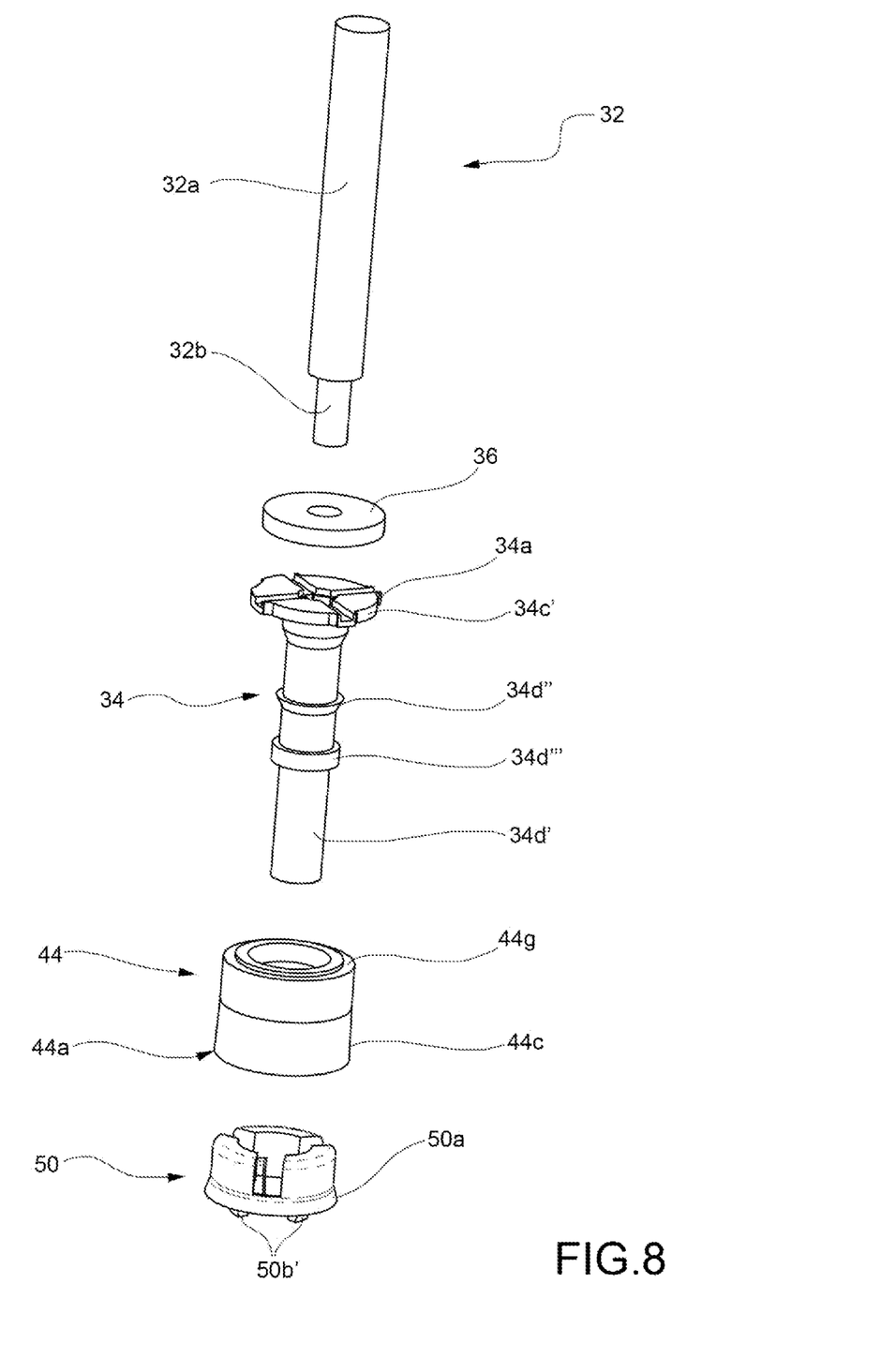
FIG. 8 is an exploded perspective view of the components of FIG. 7.

The piston 34 axially divides the inner cavity of the tubular base into a working chamber and an accumulation chamber, filled with a viscous fluid, for example silicone oil, which passes from one chamber to another during the operation of the shock absorber in the way that will be explained hereinafter. Between the bush 44 and the flanged portion 34c' of the piston, a variable volume transition chamber is defined, which on one side is connected to the accumulation chamber through the through-holes and the grooves of the flanged portion of the piston (and possibly, also through the gap between the flanged portion 34c' of the piston and the radially inner surface of the base), and on the other side connected to the working chamber through the ring-shaped passage 46, with a variable cross-section, between the radially inner surface 44d of the bush 44 and the radially outer surface of the bearing portion 34e'/stem portion 34d' of the piston 34.

The bush 44 interacts with the flanged portion 34c'/ bearing portion 34e' of the piston forming a valve, the obstructing member of which is composed of the bush 44 and the seat of which is composed of the surfaces of the flanged portion 34c' and the bearing portion 34e' of the piston. By virtue of such valve configuration, the fluid path (hereinafter, the valved fluid path) is able to selectively assume an open configuration, wherein this fluid path establishes a fluid communication between the working chamber and the accumulation chamber, and a closed configuration, wherein this fluid path is blocked.

The shock absorber further comprises a support ring member 50 made of plastic material, arranged coaxially with the bush 44. In particular, the support ring member 50 is inserted within a region surrounded by the lip portion 44a of the bush 44 and comprises a radially outer surface 50a at least partially tapered towards the rear end 44b of the bush 44. The radially outer surface 50a of the support ring member 50 is adapted to radially engage the lip portion 44a of the bush 44 from within, and to push it against the radially inner surface of the base.

The support ring member 50 comprises a plurality of retaining projections 50b' extending radially inwardly, which engage a length of the stem portion 34d' of the piston 34 comprised between the retaining flanges 34d'' and 34d'''. In this way, the support ring member 50 is axially anchored to the stem portion 34d' of the piston, with a certain travel defined by the width of the length between the retaining flanges 34d'' and 34d'''. The support ring member 50 is therefore free to move, with respect to the piston 34 and the bush 44, along a longitudinal length defined by the width of the length between the retaining flanges 34d'' and 34d'''.

FIG. 5 shows the shock absorber according to the invention when the aforesaid valve is in the open position; such position of the valve is reached with the movement of the piston 34 which moves from the position of maximum retraction to the position of maximum distension. During such movement, the bush 44 moves away from the flanged portion 34c' of the piston 34, up to a certain distance determined by the position of the retaining flange 34d''. For its part, the lip portion 44a of the bush 44 flexes to a limited extent inwardly, allowing a certain passage of fluid along the radially outer surface of the bush 44. This is allowed by the fact that the support ring member 50 moves away from the end surface 44b of the bush, until it reaches a certain distance determined by the position of the retaining flange 34d''', and therefore the radially outer surface 50a does not push the lip portion 44a of the bush 44 outwards.

The working chamber is therefore in fluid communication with the accumulation chamber through several paths. A first path is obtained through the duct 34b', through openings and passages not shown, the description of which is not essential for the purposes of the invention. A second path is formed by the ring-shaped passage between the radially inner surface 44d of the bush 44 and the radially outer surface of the piston 34, the transition chamber, the through-holes in the flanged portion of the piston and the grooves. radially arranged on the front side of the flanged end portion 34c' of the piston (and possibly also by the gap between the flanged portion 34c' of the piston and the radially inner surface of the base). A third path comprises the passage defined between the radially outer surface of the bush 44 and the radially inner surface of the base.

By virtue of the arrangement described above, during the distension movement of the piston 34 the braking force exerted by the viscous fluid is practically irrelevant, and therefore the piston 34 may move freely.

FIG. 6 shows the shock absorber according to the invention when the valve mentioned above is in the closed position; such position of the valve is reached with the movement of the piston 34, which moves from the position of maximum distension to the position of maximum retraction. During such movement, due to the pressure in the working chamber, the bush 44 approaches the flanged portion 34c' until it engages therewith. For its part, the support ring member 50 is wedged inside the lip portion 44a of the bush 44, and therefore the lip portion 44a is pushed by the tapered outer surface 50a of the support ring member 50 against the radially inner surface of the base, forming a sealed engagement.

The working chamber is therefore in fluid communication with the accumulation chamber only through the first fluid path formed through the duct 34b'. The second and the third fluid paths are on the other hand closed, respectively by the radial and axial surfaces of the bush 44 which engage respectively the bearing portion 34e' and the flanged portion 34c' of the piston 34, and the lip portion 44a of the bush 44 which engages the radially inner surface of the base.

By virtue of the arrangement described above, during the retraction movement of the piston 34, the braking force exerted by the viscous fluid is significantly greater than that exerted during the distension movement, and therefore the piston 34 is braked. The braking action is then calibrated according to the size of the section of the first fluid path and the particular throttling devices which may be used in this first path.

The invention claimed is:

1. A shock absorber comprising:
a tubular base;
a piston assembly comprising a piston mounted within the tubular base with to-and-fro sliding motion, the piston defining within the tubular base a working chamber and an accumulation chamber arranged on the rear side and on the front side of the piston respectively, and a stem connected to the piston;
a valved fluid path for connecting the working chamber with the accumulation chamber; and
a valve arranged on the valved fluid path, and comprising a ring-shaped obstructing member arranged around the piston and capable of sliding along an axial length of the piston, wherein the valved fluid path comprises a path portion formed between the piston and the obstructing member, the valved fluid path being thereby capable of selectively assuming an open configuration, in which the valved fluid path establishes a fluid communication between the working chamber and the accumulation chamber, and a closed configuration in which the valved fluid path is blocked;
wherein the obstructing member comprises a bush of plastic material, which has a flexible lip portion extending from a rear end of the bush and having a radially outer surface tapered towards the rear end of the bush; and wherein the shock absorber further comprises a support ring member arranged coaxially with the bush and movable with respect thereto, the support ring member comprising a radially outer surface tapered towards the rear end of the bush and adapted to engage radially the lip portion of the bush from the inside of the lip portion and push the lip portion against a radially inner surface of the base, in such a way as that the lip portion is adapted to exert a sealing contact against the radially inner surface of the base when the valved fluid path is in closed configuration and fluid pressure in the working chamber is greater than a fluid pressure in the accumulation chamber.

2. The shock absorber according to claim 1, wherein the bush further comprises a plurality of retaining projections extending radially inwardly, the retaining projections of the bush engaging a groove formed on a radially outer surface of the stem or the piston.

3. The shock absorber according to claim 2, wherein the support ring member further comprises a plurality of pairs of fastening tongues extending radially inwardly, the pair of fastening tongues being respectively snap-fitted to the retaining projections of the bush.

4. The shock absorber according to claim 2, wherein the support ring member further comprises a plurality of retaining projections extending radially inwardly, the retaining projections of the support ring member engaging a second groove formed on the radially outer surface of the stem or the piston.

* * * * *